US012211370B2

(12) United States Patent
Deliwala

(10) Patent No.: US 12,211,370 B2
(45) Date of Patent: Jan. 28, 2025

(54) FIRE DETECTION SYSTEM

(71) Applicant: Analog Devices, Inc., Norwood, MA (US)

(72) Inventor: Shrenik Deliwala, Andover, MA (US)

(73) Assignee: ANALOG DEVICES, INC., Wilmington, MA (US)

( * ) Notice: Subject to any disclaimer, the term of this patent is extended or adjusted under 35 U.S.C. 154(b) by 0 days.

(21) Appl. No.: 16/699,677

(22) Filed: Dec. 1, 2019

(65) Prior Publication Data

US 2020/0175848 A1 Jun. 4, 2020

Related U.S. Application Data

(60) Provisional application No. 62/774,305, filed on Dec. 2, 2018.

(51) Int. Cl.
*G08B 29/24* (2006.01)
*G01N 21/61* (2006.01)
(Continued)

(52) U.S. Cl.
CPC .............. *G08B 29/24* (2013.01); *G01N 21/61* (2013.01); *G01N 21/94* (2013.01); *G08B 17/107* (2013.01);
(Continued)

(58) Field of Classification Search
CPC ...... G01N 21/61; G01N 21/94; G01N 27/223; G01N 27/26; G08B 17/107; G08B 17/12; G08B 29/24; G01J 5/0014
(Continued)

(56) References Cited

U.S. PATENT DOCUMENTS 3,488,492 A 1/1970 Niksarian
D225,380 S 12/1972 Sanger
(Continued)

FOREIGN PATENT DOCUMENTS

CN 205786299 U 12/2016
CN 206441309 U 8/2017
(Continued)

OTHER PUBLICATIONS

Extended European Search Report in EP21178744.5, dated Dec. 10, 2021, 8 pages.
(Continued)

*Primary Examiner* — Tri T Ton
(74) *Attorney, Agent, or Firm* — ArentFox Schiff LLP

(57) ABSTRACT

Comprehensive system for fire detection and implementing thereof. The disclosed system combines and optimizes optical, electrical, and sensor sub-systems to provide the functionality demanded by the market. While many of the individual functions exist separately, none of the existing products combine elements from different sub-systems to provide a much higher level of functionality. The present disclosure shows how to build a very compact housing around the smoke detector while keeping the reflections from the housing structure to a very low value while satisfying all the other peripheral needs of fast response to smoke and preventing ambient light. This allows very small measurements of light scattering of the smoke particles to be reliable in a device resistant to the negative effects of dust.

23 Claims, 5 Drawing Sheets

(51) Int. Cl.
  *G01N 21/94* (2006.01)
  *G08B 17/107* (2006.01)
  *G08B 17/12* (2006.01)
  *G01J 5/00* (2022.01)
  *G01N 27/22* (2006.01)
  *G01N 27/26* (2006.01)

(52) U.S. Cl.
  CPC ............ G08B 17/12 (2013.01); *G01J 5/0014* (2013.01); *G01N 27/223* (2013.01); *G01N 27/26* (2013.01)

(58) Field of Classification Search
  USPC .................................................. 356/432–444
  See application file for complete search history.

(56) References Cited

U.S. PATENT DOCUMENTS

| | | | |
|---|---|---|---|
| D238,154 S | 12/1975 | Tipton et al. | |
| 4,004,146 A | 1/1977 | Blunck | |
| 4,075,614 A | 2/1978 | White | |
| 4,148,022 A | 4/1979 | Hetznecker | |
| 4,181,439 A * | 1/1980 | Tresch | G08B 17/107 250/574 |
| 4,238,679 A | 12/1980 | Macmillan | |
| 4,306,230 A | 12/1981 | Forss et al. | |
| D269,161 S | 5/1983 | Fenne | |
| 4,430,646 A | 2/1984 | Enemark | |
| RE32,105 E | 4/1986 | Enemark | |
| D283,989 S | 5/1986 | Chen | |
| D284,272 S | 6/1986 | Chen | |
| 4,618,771 A | 10/1986 | Farren | |
| 4,728,801 A | 3/1988 | O'Connor | |
| D297,318 S | 8/1988 | Taylor | |
| 4,857,895 A | 8/1989 | Kaprelian | |
| 4,906,978 A | 3/1990 | Best et al. | |
| D328,875 S | 8/1992 | Perkins | |
| 5,181,439 A | 1/1993 | Schwartz | |
| 5,351,034 A | 9/1994 | Berger et al. | |
| 5,381,130 A | 1/1995 | Thuillard et al. | |
| 5,382,341 A | 1/1995 | Aroutiounian et al. | |
| 5,400,014 A | 3/1995 | Behlke et al. | |
| 5,420,440 A * | 5/1995 | Ketler | G01N 21/534 250/573 |
| 5,444,249 A | 8/1995 | Wong | |
| 5,451,931 A | 9/1995 | Müller et al. | |
| 5,497,144 A | 3/1996 | Schaeppi et al. | |
| 5,568,129 A * | 10/1996 | Sisselman | G08B 29/145 340/309.7 |
| D382,217 S | 8/1997 | Akiyama et al. | |
| 5,689,114 A | 11/1997 | Miyazaki et al. | |
| 5,781,291 A | 7/1998 | So et al. | |
| D407,033 S | 3/1999 | Fors | |
| 5,966,077 A | 10/1999 | Wong | |
| 5,973,326 A | 10/1999 | Parry et al. | |
| D434,686 S | 12/2000 | Denman | |
| 6,194,735 B1 | 2/2001 | Martin | |
| 6,225,910 B1 | 5/2001 | Kadwell et al. | |
| 6,396,405 B1 | 5/2002 | Bernal et al. | |
| 6,476,910 B1 | 11/2002 | Hermes | |
| 6,521,907 B1 | 2/2003 | Shoaff et al. | |
| 6,756,905 B2 | 6/2004 | Rattman et al. | |
| 7,248,173 B2 | 7/2007 | Yamasaki et al. | |
| 7,806,085 B1 | 10/2010 | Waddy | |
| D653,576 S | 2/2012 | Thalhammer | |
| D653,577 S | 2/2012 | Thalhammer | |
| D653,578 S | 2/2012 | Thalhammer | |
| 8,232,885 B2 | 7/2012 | Hoshino et al. | |
| D665,289 S | 8/2012 | Thalhammer | |
| 8,970,387 B2 | 3/2015 | Brigham et al. | |
| 9,013,317 B2 | 4/2015 | Brigham et al. | |
| 9,140,646 B2 | 9/2015 | Erdtmann | |
| 9,164,735 B2 | 10/2015 | Hux et al. | |
| 9,196,141 B1 | 11/2015 | Schmidt et al. | |
| 9,267,885 B2 | 2/2016 | Pichard et al. | |
| D769,756 S | 10/2016 | Hojmose | |
| 9,459,208 B2 | 10/2016 | Orsini et al. | |
| 9,824,564 B2 | 11/2017 | Bressanutti et al. | |
| 10,019,891 B1 * | 7/2018 | Bajaj | G08B 17/107 |
| D874,964 S | 2/2020 | Bai et al. | |
| 10,674,711 B2 | 6/2020 | Hutton | |
| 10,697,880 B1 | 6/2020 | Hsieh et al. | |
| 11,796,445 B2 | 10/2023 | Deliwala | |
| 2001/0038338 A1 | 11/2001 | Kadwell et al. | |
| 2002/0089426 A1 | 7/2002 | Qualey et al. | |
| 2003/0058117 A1 | 3/2003 | Mayusumi et al. | |
| 2003/0209670 A1 | 11/2003 | Chang et al. | |
| 2004/0063154 A1 | 4/2004 | Booth et al. | |
| 2004/0072535 A1 * | 4/2004 | Schneider | F24F 11/0001 454/229 |
| 2004/0188598 A1 | 9/2004 | Kawai | |
| 2005/0077489 A1 | 4/2005 | Knapp et al. | |
| 2005/0173638 A1 | 8/2005 | Powell | |
| 2007/0013883 A1 * | 1/2007 | Park | G01N 21/94 355/18 |
| 2007/0221848 A1 | 9/2007 | Johnson et al. | |
| 2007/0242269 A1 | 10/2007 | Trainer | |
| 2008/0246623 A1 | 10/2008 | Nagashima | |
| 2008/0258903 A1 | 10/2008 | Le | |
| 2008/0266558 A1 | 10/2008 | Hess et al. | |
| 2008/0316489 A1 | 12/2008 | Ludwig | |
| 2009/0213380 A1 | 8/2009 | Appel et al. | |
| 2009/0235720 A1 | 9/2009 | Smith | |
| 2009/0268204 A1 | 10/2009 | Tkachuk | |
| 2011/0042570 A1 | 2/2011 | Wong | |
| 2011/0149198 A1 | 6/2011 | Kim et al. | |
| 2011/0178420 A1 | 7/2011 | Ridder et al. | |
| 2012/0135405 A1 * | 5/2012 | Toumbas | G01N 21/532 435/6.11 |
| 2012/0140231 A1 * | 6/2012 | Knox | H01L 29/7786 356/442 |
| 2012/0267532 A1 | 10/2012 | Udrea et al. | |
| 2013/0008787 A1 | 1/2013 | Mammoto et al. | |
| 2013/0051062 A1 | 2/2013 | Lee et al. | |
| 2013/0071290 A1 | 3/2013 | Goldstein et al. | |
| 2013/0135607 A1 | 5/2013 | Wedler et al. | |
| 2013/0286393 A1 * | 10/2013 | Erdtmann | G08B 17/107 250/338.5 |
| 2014/0070101 A1 | 3/2014 | Matsushima et al. | |
| 2014/0168647 A1 * | 6/2014 | Ju | G08B 17/107 29/527.1 |
| 2015/0129767 A1 | 5/2015 | Kouznetsov et al. | |
| 2015/0219491 A1 | 8/2015 | Lee et al. | |
| 2015/0300938 A1 | 10/2015 | Debreczeny | |
| 2015/0377711 A1 | 12/2015 | Steffanson | |
| 2016/0033307 A1 | 2/2016 | Yanobe | |
| 2016/0042638 A1 * | 2/2016 | Sangha | G08B 29/26 340/628 |
| 2016/0153905 A1 | 6/2016 | Allemann et al. | |
| 2017/0046935 A1 | 2/2017 | Allemann | |
| 2017/0169682 A1 | 6/2017 | Bressanutti | |
| 2017/0180147 A1 | 6/2017 | Brandman et al. | |
| 2017/0191930 A1 * | 7/2017 | Warren | G01K 7/01 |
| 2017/0241904 A1 | 8/2017 | Barritault et al. | |
| 2017/0261425 A1 | 9/2017 | Deliwala | |
| 2018/0348121 A1 | 12/2018 | Deliwala | |
| 2018/0365955 A1 | 12/2018 | Bajaj | |
| 2020/0209158 A1 * | 7/2020 | Nikolaenko | G01N 21/6428 |
| 2021/0072082 A1 | 3/2021 | Valouch et al. | |

FOREIGN PATENT DOCUMENTS

| | | |
|---|---|---|
| DE | 102010031139 A1 | 1/2012 |
| DE | 202015000820 U1 | 3/2015 |
| EP | 0896216 A2 | 2/1999 |
| EP | 2492882 A1 | 8/2012 |
| EP | 3270362 A1 | 1/2018 |
| GB | 2000282 A | 1/1979 |
| GB | 2270157 A | 3/1994 |
| GB | 2327752 A | 2/1999 |
| GB | 2397122 A | 7/2004 |
| JP | 09-229858 A | 9/1997 |

(56) References Cited

FOREIGN PATENT DOCUMENTS

| | | |
|---|---|---|
| JP | 2002-162626 A | 6/2002 |
| JP | 1364184 | 7/2009 |
| JP | 2011-014593 A | 1/2011 |
| JP | 1410148 S | 3/2014 |
| JP | D1410148 | 3/2014 |
| KR | 10-2004-0021772 A | 3/2004 |
| KR | 300379452000 | 4/2005 |
| KR | 3006241260000 | 12/2011 |
| KR | 3006324530000 | 2/2012 |
| KR | 10-2012-0130957 A | 12/2012 |
| TW | 565384 | 12/2003 |
| TW | 566634 | 12/2003 |
| TW | 596351 | 6/2004 |
| TW | D091390 | 12/2004 |
| TW | 201237811 A | 9/2012 |
| TW | D151506 | 1/2013 |
| TW | 201434015 A | 9/2014 |
| WO | 9914576 A2 | 3/1999 |
| WO | 01/95279 A1 | 12/2001 |
| WO | 2016/150613 A1 | 10/2016 |
| WO | 2016/186884 A1 | 11/2016 |
| WO | 2017/021217 A1 | 2/2017 |

OTHER PUBLICATIONS

International Search Report and Written Opinion issued International Patent Application Serial No. PCT/US18/35203 dated Aug. 29, 2018, 11 pages.
Non-Final Office Action mailed May 19, 2021 in U.S. Appl. No. 16/825,339, 40 pages.
Office Action in JP2019011841, dated Sep. 27, 2022, 4 pages.
Office Action in KR20197034036, dated Aug. 26, 2022, 5 pages.
Search Report in TW107144950, dated Sep. 5, 2019, 2 pages.
Search Report in TW108303224, dated Oct. 4, 2019, 1 page.
Search Report in TW108303226, dated Oct. 3, 2019, 1 page.
Search Report in TW109301973, dated Dec. 4, 2019, 1 page.

* cited by examiner

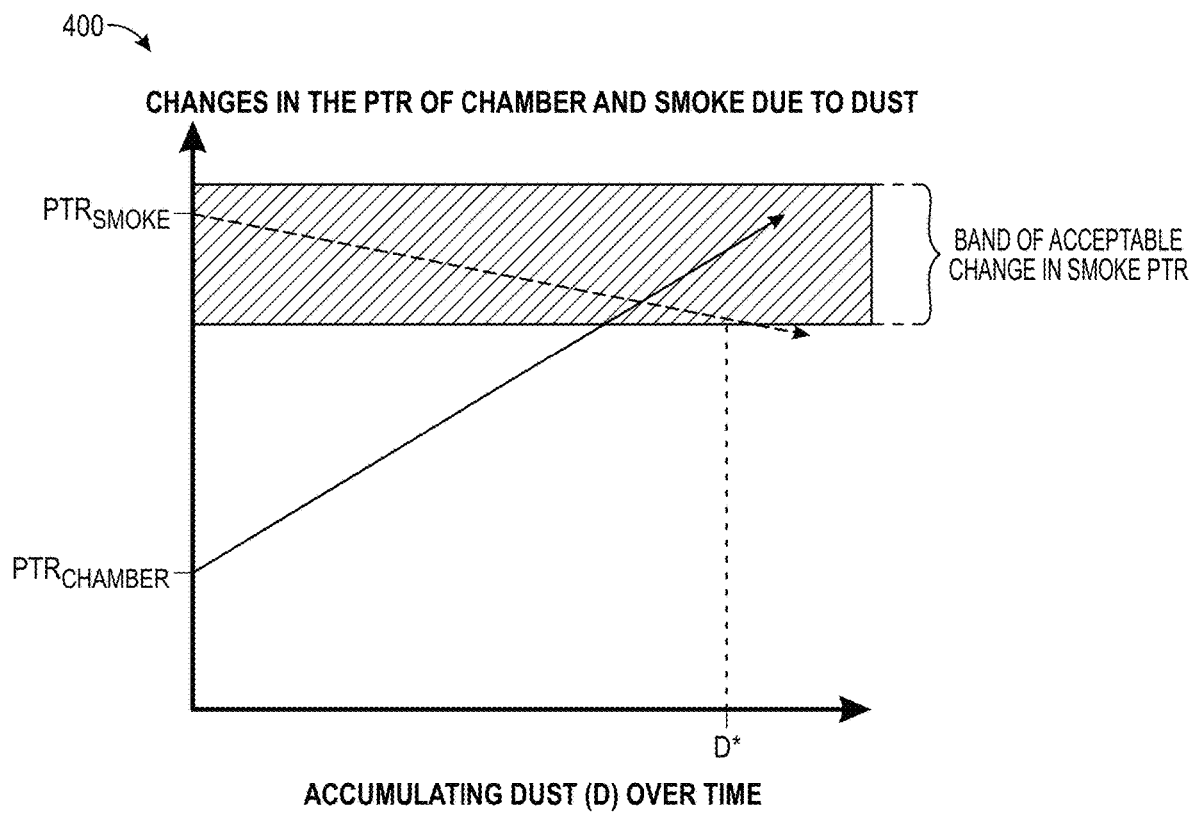
FIG. 4
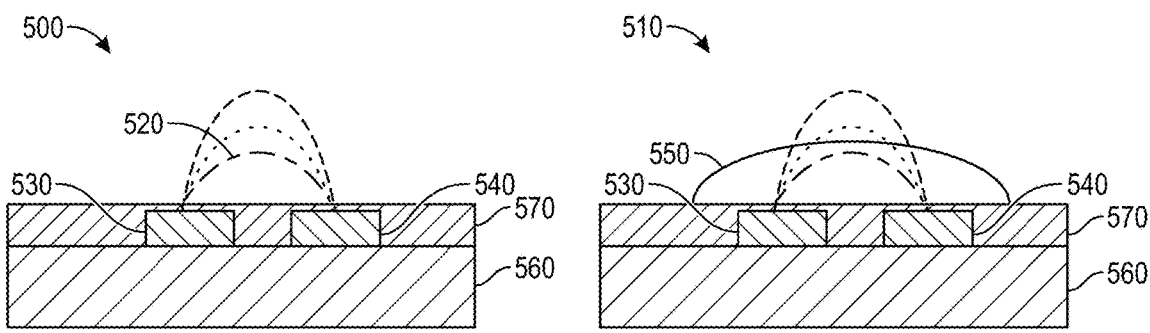
FIG. 5A  FIG. 5B

FIRE DETECTION SYSTEM

CROSS-REFERENCE TO RELATED APPLICATIONS

This application is related to and claims the benefit of priority under 35 U.S.C. § 119(e) to U.S. Provisional Application No. 62/774,305 entitled, "FIRE DETECTION SYSTEM" filed on Dec. 2, 2018 and is related to U.S. patent application Ser. No. 16/181,878 entitled, "COMPACT OPTICAL SMOKE DETECTOR SYSTEM AND APPARATUS" filed on Nov. 6, 2018 and U.S. patent application Ser. No. 16/206,268 entitled, "SMOKE DETECTOR CHAMBER BOUNDARY SURFACES" filed on Nov. 30, 2018, all of which are hereby incorporated by reference in their entirety.

FIELD OF THE DISCLOSURE

This disclosure relates in general to the field of smoke detection, and more particularly, though not exclusively, to various embodiments of complete fire detection systems.

BACKGROUND

A smoke detector is a device that senses smoke, typically as an indicator of fire. Commercial security devices issue a signal to a fire alarm control panel as part of a fire alarm system, while household smoke detectors, also known as smoke alarms, generally issue a local audible or visual alarm from the detector itself.

Smoke detectors are housed in plastic enclosures, typically shaped like a disk about 150 millimeters (6 in) in diameter and 25 millimeters (1 in) thick, but shape and size vary. Smoke can be detected either optically (photoelectric) or by physical process (ionization), detectors may use either or both methods. Sensitive alarms can be used to detect, and thus deter, smoking in areas where it is banned. Smoke detectors in large commercial, industrial, and residential buildings are usually powered by a central fire alarm system, which is powered by the building power with a battery backup.

Domestic smoke detectors range from individual battery-powered units, to several interlinked mains-powered units with battery backup; with these interlinked units, if any unit detects smoke, all trigger even if household power has gone out. Optical smoke detectors tend to be larger in size. And consequently, 90% of domestic smoke detectors uses ionization technology.

While ionization smoke alarms are generally more responsive to flaming fires, photoelectric smoke alarms are generally more responsive to fires that begin with a long period of smoldering (called "smoldering fires"). For each type of smoke alarm, the advantage it provides may be critical to life safety in some fire situations. Home fatal fires, day or night, include a large number of smoldering fires and a large number of flaming fires. One cannot predict the type of fire one may have in a home or when it will occur. Any smoke alarm technology, to be acceptable, must perform acceptably for both types of fires in order to provide early warning of fire at all times of the day or night and whether one is asleep or awake.

An ionization smoke detector uses a radioisotope, typically americium-241, to ionize air; a difference due to smoke is detected and an alarm is generated. The smoke detector has two ionization chambers, one open to the air, and a reference chamber which does not allow the entry of particles. The radioactive source emits alpha particles into both chambers, which ionizes some air molecules.

There is a potential difference (voltage) between pairs of electrodes in the chambers; the electrical charge on the ions allows an electric current to flow. The currents in both chambers should be the same as they are equally affected by air pressure, temperature, and the ageing of the source. If any smoke particles enter the open chamber, some of the ions will attach to the particles and not be available to carry the current in that chamber. An electronic circuit detects that a current difference has developed between the open and sealed chambers, and sounds the alarm.

A photoelectric, or optical smoke detector contains a source of infrared, visible, or ultraviolet light (typically an incandescent light bulb or light-emitting diode), a lens, and a photoelectric receiver (typically a photodiode). In spot-type detectors all of these components are arranged inside a chamber where air, which may contain smoke from a nearby fire, flows. In large open areas such as atria and auditoriums, optical beam or projected-beam smoke detectors are used instead of a chamber within the unit: a wall-mounted unit emits a beam of infrared or ultraviolet light which is either received and processed by a separate device, or reflected back to the receiver by a reflector.

In some types, particularly optical beam types, the light emitted by the light source passes through the air being tested and reaches the photosensor. The received light intensity will be reduced by absorption due to smoke, air-borne dust, or other substances; the circuitry detects the light intensity and generates the alarm if it is below a specified threshold, potentially due to smoke. In other types, typically chamber types, the light is not directed at the sensor, which is not illuminated in the absence of particles. If the air in the chamber contains particles (smoke or dust), the light is scattered and some of it reaches the sensor, triggering the alarm.

As stated, ionization detectors are more sensitive to the flaming stage of fires than optical detectors, while optical detectors are more sensitive to fires in the early smoldering stage. Fire safety experts and the National Fire Protection Agency recommend installing what are called combination alarms, which are alarms that either detect both heat and smoke, or use both the ionization and photoelectric processes. Combination alarms that include both technologies in a single device are available, with some even including a carbon monoxide detection capability.

Unfortunately, the size and/or footprint of optical smoke detectors make them impermissible for the vast majority of home use, as well as a large proportion of business use. The inventor of the present disclosure has identified these shortcomings and recognized a need for a more compact, robust optical smoke detector system. That is, an optical smoke detector which is small enough for ubiquitous use while being robust enough for years of long life maintaining a sensitive state.

This disclosure is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

Comprehensive system for fire detection and implementing thereof. The disclosed system combines and optimizes optical, electrical, and sensor sub-systems to provide the functionality demanded by the market. While many of the individual functions exist separately, none of the existing products combine elements from different sub-systems to provide a much higher level of functionality. The present disclosure shows how to build a very compact housing around the smoke detector while keeping the reflections from the housing structure to a very low value. This also satisfies the other peripheral needs of fast response to smoke and preventing ambient light. This allows very small measurements of light scattering of the smoke particles to be reliable in a device resistant to the negative effects of dust.

According to one aspect, the present disclosure is an apparatus for identifying smoke using optical analysis techniques described herein. Specifically, the apparatus is disposed in an optical smoke detector and identification is executed within.

According to another aspect of the device, light is transmitted through the air through which it is scattered by the smoke particles.

According to another aspect, the scattered light is incident upon on or more detectors, each of which are disposed at various distance relative to a light source from the light was transmitted.

According to another aspect, the ratio(s) of detected light is used to determine the presence of smoke.

According to yet another aspect, the apparatus utilizes logic which when executed performs the steps in receiving the light information and making a smoke determination.

According to another aspect of the present disclosure, the apparatus further comprises a cap disposed substantially orthogonal to the first light source.

According to another aspect of the present disclosure, the cap is shaped substantially like a conic section, at least in part.

According to another aspect of the present disclosure, the cap of the conic section is a parabola, at least in part.

According to another aspect of the present disclosure, the cap of the conic section is an ellipse, at least in part.

According to another aspect of the present disclosure, the apparatus further comprises a first light emitting diode have a spectral intensity centered about a first wavelength, $\lambda_1$.

According to another aspect of the present disclosure, the apparatus further comprises an array of optical deflection elements disposed substantially in a circle around the outer radius of the cap.

According to another aspect of the present disclosure, the apparatus further comprises an anti-reflective coating disposed on at least one of cap and array of optical deflection elements.

According to another aspect of the present disclosure, the coating is centered about the first wavelength, $\lambda_1$.

According to another aspect of the present disclosure, the apparatus further comprises a substrate in which the cap is mechanically coupled thereto.

According to another aspect of the present disclosure, the array of optical deflection elements is substantially wing-shaped.

According to another aspect, the present disclosure comprises an analog front-end in electrical communication with one or more photodetectors.

According to yet another aspect of the invention, more than one light source is used, each having wavelengths centered at different frequencies.

According to yet another aspect of the invention, each wavelength contributes to the determination of the presence of smoke.

According to yet another aspect of the invention, a plurality of lossy members surrounds the center of the detector chamber.

According to yet another aspect of the invention, the plurality of lossy members is substantially configured to be columns.

According to yet another aspect of the invention, the plurality of lossy members is substantially configured to be wing-like features resembling cooling fins.

According to yet another aspect of the invention, the plurality of lossy members is substantially configured to have an index of refraction close to that of household dust.

According to yet another aspect of the invention, the plurality of lossy members also has an imaginary part of the complex impedance which is lossy. This serves not only to mitigate reflections (impedance matching) but absorb power (lossy medium) from ambient light which can give false smoke detector positives.

According to another aspect of the invention, the compact smoke detector can be comprised by a single analog front-end (AFE).

According to another aspect of the invention, the compact smoke detector and single analog front-end (AFE) can be fabricated from a plurality of dies on a substrate.

According to another aspect of the invention, the compact smoke detector can use one or more optical filters.

According to yet another aspect of the invention, the compact smoke detector can use the one or more optical filters. Specifically, the optical filter can include an absorptive filter and/or interference or dichroic filters.

According to another aspect of the present disclosure, a compact system comprising at one or more LEDs, one or more photodetectors, and an AFE designed to provide stimulus and measure optical scattering.

According to another aspect of the present disclosure, direct measurement of the type of smoke can be from both wavelength and angle dependence of optical scattering.

According to another aspect of the present disclosure, a provision of optical surface that provides permanent reflection from the light source to provide a small optical signal comparable to the signal generated by smoke, where in comparable means within ⅕₀th to 50× of the typical smoke signal at the alarm level.

According to another aspect of the present disclosure, direct measurement of dust accumulation on other optical surfaces to determine critical level of dust.

According to another aspect of the present disclosure, the aforementioned AFE also provides a measurement of condensing from steam to reduce false alarm using a strip line to measure changes in capacitance due to presence of water on the surface.

According to another aspect of the present disclosure, the aforementioned AFE also provides a measurement of one or more air temperature sensors.

According to another aspect of the present disclosure, the aforementioned AFE also provides a measurement of one or more MWIR sensors.

According to another aspect of the present disclosure, the aforementioned AFE also provides a measurement of one or more electrochemical cells to measure gases such as CO, Nitrous compounds etc.

A system containing optical detector and at least one of other auxiliary sensors such as condensing water measurement using strip line, temperature, IR radiation, or an EC, coupled with a microprocessor to determine the dust levels and smoke levels as well as smoke type classification using the procedure described here.

The drawings show exemplary smoke detector circuits and configurations. Variations of these circuits, for example, changing the positions of, adding, or removing certain elements from the circuits are not beyond the scope of the present invention. The illustrated smoke detectors, configurations, and complementary devices are intended to be complementary to the support found in the detailed description.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

For a fuller understanding of the nature and advantages of the present invention, reference is made to the following detailed description of preferred embodiments and in connection with the accompanying drawings, in which:

FIG. 4 graphically illustrates dust measurement in chamber as a function of time, in accordance with some embodiments of the disclosure provided herein;

FIGS. 5A-B demonstrate the detection and measurement of water within the exemplary fire detection system, in accordance with some embodiments of the disclosure provided herein; and, FIG. 6 depicts the orthogonal view of an optical deflector comprised by an exemplary fire detection system, in accordance with some embodiments of the disclosure provided herein.

DETAILED DESCRIPTION

Figure 1:
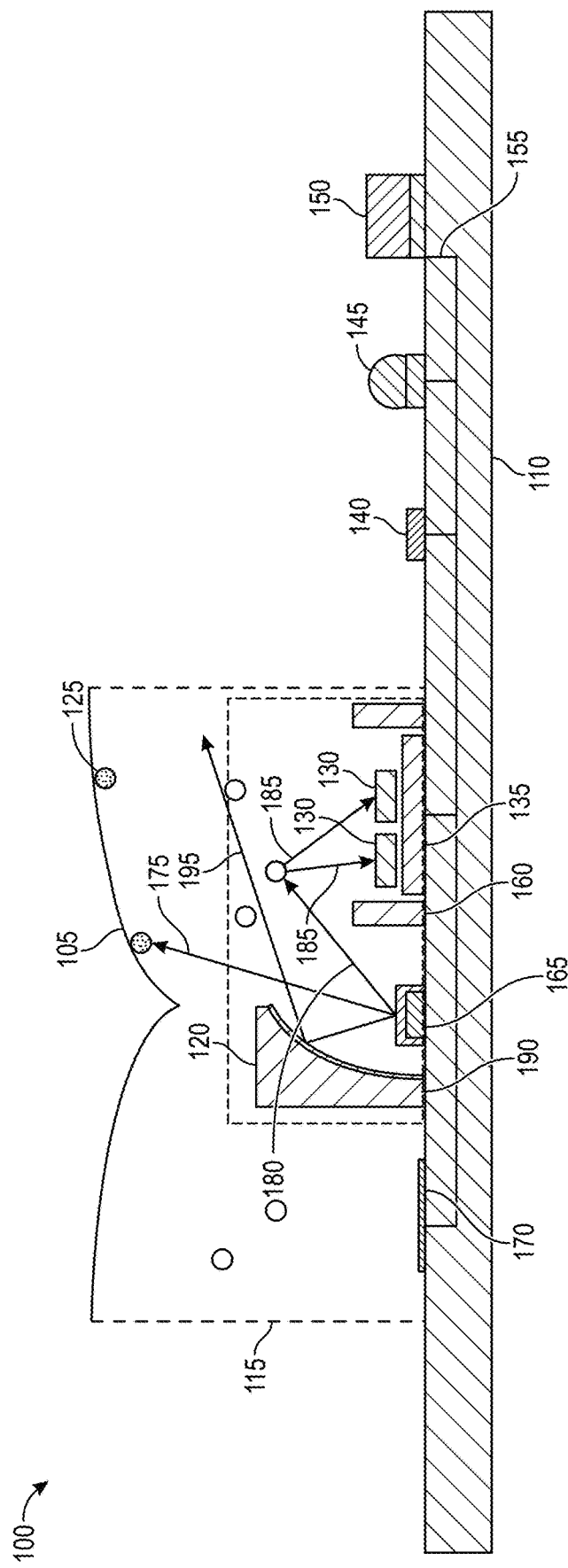
FIG. 1 shows a side view of an exemplary smoke detector system, in accordance with some embodiments of the disclosure provided herein.

The present disclosure relates to smoke detection. More specifically, this disclosure describes apparatus and techniques relating to the optical boundary surfaces within a compact smoke detector.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Fires can occur in a variety of ways. The two most common forms of fires are slow smoldering fires and fast flaming fires. A smoldering fire is a slow, low-temperature, flameless form of combustion. These fires develop slowly and generate a significant amount of smoke which is easily detected by an optical smoke detector. Smoldering fires are typically initiated on upholstered furniture by weak heat sources such as cigarettes or an electrical short-circuit.

Fast flaming fires develop rapidly, typically generating black smoke and toxic fumes and leave little time for escape. The characteristic temperature and heat released during smoldering (typically 600° C.) are low compared to those in a fast flaming fire (typically 1500° C.). Fast flaming fires propagate typically about ten times faster than smoldering fires. However, smoldering fires emit a high level of toxic fires such as carbon monoxide. These gases are highly inflammable and could later be ignited in the gas phase, triggering the transition to flaming combustion.

Smoke detectors for detecting smoke through detection of scattered light by smoke particles have conventionally been proposed and put into practice. Such a smoke detector detects a fire as follows. The smoke detector has a dark chamber for storing a photo emitter and a photo detector. Light emitted from the photo emitter is scattered by smoke particles having flowed into the dark chamber, to thus generate scattered light. The photo detector receives the scattered light.

Optical type smoke alarms have several systemic and operational disadvantages when compared with ionization type smoke alarms. In recent years, smoke detectors including light traps for inhibiting noise light (light generated by reflection, by an inner wall of the dark chamber, of light having been emitted from the photo emitter) from reaching the photo detector have been proposed.

There are in general two types of noise light—one caused by unwanted reflections from nearby surfaces of the light emitted from the photo emitter and ambient light that leaks into the smoke chamber. Both of these lights need to be avoided since there is no way for the photodetector to decide whether light is caused by reflection or from scattering or from the ambient. When such a smoke detector is adopted, one must design the optical and electrical system to avoid false triggering by noise light. The inventors of the present disclosure have recognized how to improve on both fronts while reducing the size and cost, while adding to the aesthetics.

However, in such a smoke detector, the light trap is disposed in front of the photo emitter and the photo detector. Therefore, light emitted from the photo emitter is reflected in a direction parallel to a virtual plane including an optical axis of the photo emitter and that of the photo detector. Accordingly, since noise light is easily incident to a light detecting region, occurrence of a false alarm remains highly possible.

Some smoke detectors employ a labyrinth structure for inhibiting light from entering the dark chamber. Since light emitted from the photo emitter is reflected by edge sections of wall members constituting the labyrinth structure, irregular noise light of an amount that cannot be sufficiently attenuated by the light trap is generated. Therefore, the noise light may enter the light detecting region, to thus cause a false alarm.

In addition, within these types of smoke detectors, a plurality of light traps must be disposed and, a light trap must be disposed inside the labyrinth structure within the dark chamber. Accordingly, either case requires a large space for disposing the light trap, whereby miniaturization of the smoke detector has encountered difficulty. Also, some smoke detectors include another member such as a lens in addition to the light trap, whereby the cost for manufacturing the smoke detector may be increased. Furthermore, the light trap and/or the lens may inhibit smoke from flowing into the dark chamber.

In addition to larger footprints, relative to ionization alarms, optical detection devices suffer from confirmation during the course of their service. Both optical smoke alarms which use an infra-red emitter LED and ionization type smoke alarms are used in the detection of both types of fires and rely upon a flux of ambient air passing through them. In some devices (as in one or more of the foregoing embodiments), fans are employed to facilitate the passage of air through them. However, dust and particulate matter can collect and contaminate some of their device elements. These surfaces become more reflective in all directions so that any light falling on these surfaces can now be scattered into the photodetector in a manner similar to the smoke.

Still, optical detection systems are favored over ionization type systems in certain circumstances. For example, optical systems better detect smoldering fires. Additionally, ionization alarms have the disadvantage that, as they contain radioactive isotopes in their sensors, they are subject to regulations concerning their manufacture and disposal. These regulations depend upon the country but can place a considerable burden on the manufacturer.

Optical smoke detectors tend to be large, expensive devices which degrade with age from contamination, giving off false positives. The inventor of the present disclosure has recognized the need for a more robust optical smoke detector, which is on the size order with that of the ubiquitous household ionization unit and is relatively insensitive to the threat of dust and other particulate contamination. Furthermore, the optical surfaces within the chamber itself play an important part to this this end.

Smoke detectors are ubiquitous and are important safety devices. They are tasked to alarm for smokes that are likely to cause fire or are a result of fire but ignore smokes that result from cooking. They also should not alarm with steam coming from proximity to the bathrooms. They should be extremely power-efficient with battery lasting a decade or more and yet be immune to dust build-up. They should also provide self-check functions.

Furthermore, they need to incorporate other safety functions such as sensing presence of carbon monoxide (CO) or sudden rise in temperature which may be indicative of fire. And even with all the demanded functionality, they should be small and attractive to look at. This means that there is a need for a compact, low power smoke detection system.

The system described herein provides the above desired features. It combines and optimizes optical, electrical, and sensor sub-systems to provide the functionality demanded by the market. While many of the individual functions exist separately, none of the existing products combine elements from different sub-systems to provide a much higher level of functionality. This is accomplished by one or more of the following.

A small optical module that accommodates multiple color LEDs and multiple photodiodes with a flexible sensor measuring analog integrated chip (AFE) to provide multi-wavelength, multi-angle optical scattering measurement as well as measurement of other electrical and electro-chemical sensors.

Multi-wavelength and multi-angle scattering allow one to distinguish different particle types.

An optical module containing molded optical surfaces which improves light scattering and collection efficiency for long battery life or low power operation.

A chamber surrounding the module that provides:
  (a) a small optical reflection—even though it presents a large surface area and is very close to the module—comparable to that from the smoke. This persistent reflection provides positive test that the system is working. As is shown, this also allows us to measure slow dust accumulation on the chamber surfaces over time and thus provide warning that more than a critical level of dust may have accumulated impairing the smoke alarm function;
  (b) a place to hold bug-screen or may have bug-screen molded into it; and,
  (c) provide significant attenuation of ambient light while allowing smoke to enter the chamber.

An analog front end (AFE) that electrically communicates with and/or controls with not only photodiodes (PDs) and light emitting diodes (LEDs) but also one or more:
  (a) temperature sensor to provide temperature measurement—perhaps more than one pointed in different directions;
  (b) a water condensation sensor that warns of condensing humidity especially from a large volume of steam coming from a bathroom after shower;
  (c) an electrochemical or an optical gas sensor to measure concentration of CO and other gases; and,
  (d) other sensors such as pressure, humidity etc.

FIG. 1 shows a side view of an exemplary smoke detector system 100, in accordance with some embodiments of the disclosure provided herein. Smoke detector system 100 comprises chamber walls 115, chamber cap 105, optical module 190, condensation sensor 170, LEDs 165, septum 160, PDs 130, AFE 135, traces 155, temperature sensor 140, radiation sensor 145, substrate 110, and gas sensor 150.

In one or more embodiments, chamber walls 115 are bug screens or air vents which allow for ambient air flow but mitigate ambient light pollution. In other embodiments, chamber walls 115 and chamber cap 105 can be any of those described in U.S. patent application Ser. No. 16/206,268 entitled, "SMOKE DETECTOR CHAMBER BOUNDARY SURFACES" filed on Nov. 30, 2018, which is hereby incorporated by reference.

That is, chamber walls 115 may be an array of optical blocking member whereby no direct ambient light may travel inside the smoke detection chamber. Chamber cap 105 can be any suitable geometric shape which reflects light which isn't absorbed in a direction other than towards PDs 130. This will become clearer once the operation has been discussed in greater detail later in the disclosure.

Optical module 190 serves a similar purpose to that of chamber cap 105 in that it is also a geometrical shape which redirects the light emitted from LEDs 165. The exception is that optical module 190 reflects light to be in close proximity to PDs 130 to achieve a better signal to noise ration. This will also be discussed in greater detail later in the disclosure. As with chamber cap 105, optical module 190 can have one or more optical coatings on their respective surfaces—either reflective or anti-reflective depending on the wavelength of the LEDs, the ambient light, and application.

In one or more embodiments, condensation sensor 170 is a monolithic integrated micro-sensor for the detection of humidity. The modules consist of a silicon integrated stray field capacitor including condensation detection area, a temperature sensor as well as a capacity frequency converter. The components are mounted on substrate 110.

In practice, steam particles often produce false positives. An integrated condensation sensor 170 would allow a user to compensate particle detection by steam exposure. In some embodiments, condensation sensor 170 is a capacitive strip line which can be printed into a printed circuit board (PCB), laminate, or substrate 110. All humidity and condensate sensors are not beyond the scope of the present invention.

In one or more embodiments, one of LEDs 165 is an off-the-shelf green (495 nm-570 nm) light emitting diode, with the other LEDs 165 having a longer wavelength, such as that in the infrared regime. However, any suitable, compact light producing device is not beyond the scope of the present disclosure—whether coherent, incandescent, or even thermal black-body radiation, etc.

Septum 160 is an opto-isolator which traverses the entire span between the LEDs 165 side and the photodetectors 130 side of the device, which will be explained in greater detail later in the disclosure. The function of the septum is to block light from being directly received by photodetectors 130. As such, septum 160 are made from an opaque polymer and/or lossy material having a thickness much greater than the average skin depth, according to some embodiments of the present invention. High conductivity (mirrored) are also not beyond the scope of the present disclosure, however, this is not a preferred embodiment as will be clear later in the disclosure.

Photodetectors (PDs) 130 are sensors of light or other electromagnetic energy. In some embodiments, photodetectors 130 have p-n junctions that converts light photons into current. The absorbed photons make electron-hole pairs in the depletion region, which is used to detect received light intensity. In some embodiments, photodetectors 130 are photodiodes or phototransistors. However, any light detecting means, e.g., avalanche, photo-multiplier tube, etc. is not beyond the scope of the present disclosure.

In some embodiments where LEDs 165 emit different wavelengths, PDs 130 can be modified to accommodate the detection thereof. For example, PDs 130 can be covered with different optical filters.

In particular, photodetectors 130 can be covered with dichroic filters, at least in part. A dichroic filter, thin-film filter, or interference filter is a very accurate color filter used to selectively pass light of a small range of colors while reflecting other colors. By comparison, dichroic mirrors and dichroic reflectors tend to be characterized by the color(s) of light that they reflect, rather than the color(s) they pass.

While dichroic filters are used in the present embodiment, other optical filters are not beyond the scope of the present invention, such as, interference, absorption, diffraction, grating, Fabry-Perot, etc. An interference filter consists of multiple thin layers of dielectric material having different refractive indices. There also may be metallic layers. In its broadest meaning, interference filters comprise also etalons that could be implemented as tunable interference filters. Interference filters are wavelength-selective by virtue of the interference effects that take place between the incident and reflected waves at the thin-film boundaries.

In other embodiments, a plurality of detectors is implemented, e.g., at least two for wavelength such that each of the pair of the plurality is wavelength specific. For example, there are at least two detectors (PD1, PD2) for every light emitting diode for a particular lambda.

Analog front-end 135 (AFE) is a set of analog signal conditioning circuitry that uses sensitive analog amplifiers, operational amplifiers, filters, and application-specific integrated circuits as needed to interface with sensors to analog to digital converter and/or microcontroller. AFE 135 is in electrical communication with photodetectors 130, condensation sensor 170, temperature sensor 140, radiation sensor 145, and gas sensor 150 via traces 155 through substrate 110.

In the present embodiment, photodetectors 130, LEDs 165 and AFE 135 are packed together and then assembled to a PCB with other associated sensors. However, in other embodiments, they are integrated at the wafer level communicating through traces and vertical interconnect access (VIA) or through silicon VIA (TSV).

In some embodiments, AFE pin-out can be in electrical communication with a microcontroller unit (MCU), field programmable gate array (FPGA), bus, or other computer platform, such as, Arduino or Raspberry Pi, etc.—all of which are not beyond the scope of the present disclosure.

In operation, smoke detector system 100 works as follows. Light rays (photons) are emitted from LEDs 165. By way of example, light rays take disparate paths each of which are explained as follows. Light ray 195 represents a light path which impinges on optical module 190 and gets reflected over the PDs 130 such that the area above PDs 130 have a higher concentration of light. This increases the smoke detector sensitivity by augmenting the SnR.

Light ray 175 is incident on dust particle(s) 125 adsorbed to chamber cap 105. The material properties of chamber cap 105 are suitably chosen such that light ray 175 is either absorbed by chamber cap 105 or reflected therefrom. In either event, neither are scattered back to PDs 130. Finally, light ray 180 is scattered off of smoke particle(s) and receive by PDs 130.

The region marked by dashed box 120 may represent a single optical module containing multiple LEDs 165, multiple photodiodes 130, AFE 135 to read all the sensors and store calibration data, and optical surfaces. This is used for optical isolation between photodiodes 130 and LEDs 165 as well as light directing surfaces to improve detection of smoke and reduce scattering from chamber walls. The commercially available Analog Devices ADPD188BI (Shown in FIG. 1) does contain septum separating LED and PD but does not contain curved optical surfaces to substantially redirect light towards smoke near the detector surface. It also reduces LED light radiated into regions that contribute to background from chamber wall. These regions are to also eschewed because they do not significant contribute measurement to scattering from smoke particles.

There are many ways to accomplish this and the FIG. 1 simply represents a simple modification of ADPD188BI to improve performance. These curved surfaces can provide between two to three times the smoke signal while reducing the background signal from the chamber. Detailed ray-trace simulations have been carried out by the inventor. The surface takes a form of ellipsoidal or off-axis paraboloid shape, in preferred embodiments. However, other embodiments represent inverse or other mathematical functions are not beyond the scope of the present disclosure.

The chamber design itself has been described in detail in the above identified patent application. It is designed to minimize back-reflection to the detector and consists of smooth mirror like surfaces with light being absorbed in the bulk of the material. With these chamber designs, an effective chamber reflection coefficient has been achieved which is comparable to the light scattered by low density of smoke particles that cause smoke alarm.

At least one possible AFE capable of supporting such a wide variety of inputs and sensors has been described in the issued U.S. Pat. Nos. 10,056,868 and 9,983,355, which are hereby incorporated by reference. The AFE 135 shown in FIG. 1 is one such AFE. While AFE 135 is shown as part of the optical PD and LED assembly, such an AFE may be separate and placed directly on the laminate or PCB and remain connected to all the sensors shown in FIG. 1.

The AFE is expected to measure synchronous LED light received by the photodetectors. Each LED is flashed, and the optical return is measured by one or two photodiodes. This allows measurement at one or more wavelengths and at one or more average angles of scattering. As is described herein, such measurements allow for smoke particle classification which is very useful in setting appropriate thresholds for smoke alarm as is often required by the regulations. Furthermore, this AFE is also expected to read capacitance changes from stripline as well as measure midwave infrared (MWIR) photodetectors, electrochemical cells, and temperature sensors.

In the present disclosure, various components and their respective roles are examined and shown relative to FIG. 1 in order to achieve a robust smoke detector. First, the present disclosure turns its attention to the presence of chamber itself.

Figure 2:
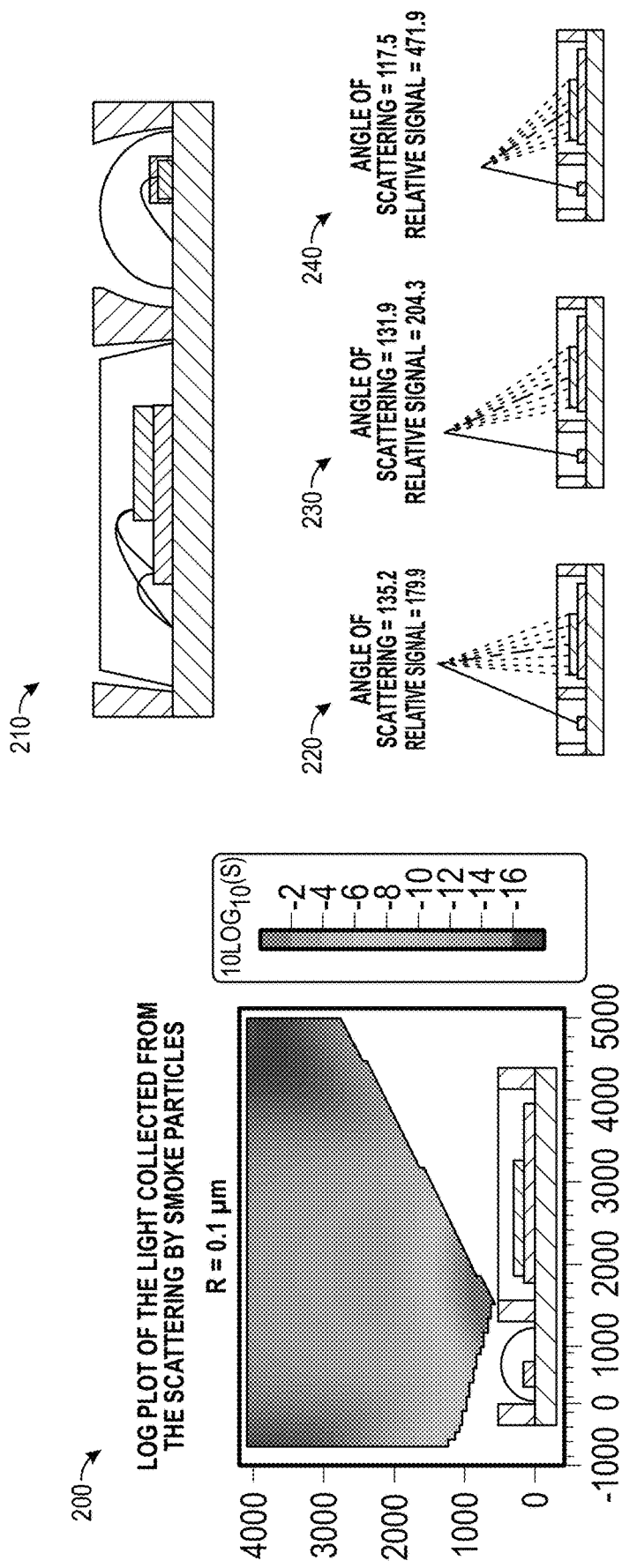
FIG. 2 illustrates light scattering in an exemplary smoke detector, in accordance with one or more embodiments of the disclosure provided herein.

FIG. 2 illustrates light scattering in an exemplary smoke detector, in accordance with one or more embodiments of the disclosure provided herein. FIG. 2 depicts a log plot of the light collected from the scattering by smoke particles. FIG. 2 also illustrates an exemplary packaged smoke detector 210 complete with bond pad wiring and optical covers, in accordance with one or more embodiments of the disclosure provided herein. As one of skill in the art can appreciate, relative signal strengths are measured as a function of the scattering angle 220, 230, 240.

Due to the presence of the chamber, a constant low-level signal is present from the chamber which will slowly increase over time due to dust accumulation. It is very important to note that small accumulation of dust will substantially raise the chamber background but barely decrease the light emitted by the LED or received by the photodetector. This follows from the fact that scattered light by small dust particles is a miniscule portion of the total light (<10−6) and thus the forward light intensity is barely changed. But this very small scattered light from the chamber walls due to dust will reach back to the photodetectors and add to the chamber's effective reflectance.

The chamber designs have yielded optical power transfer ratio (PTR) of ~0.1-1 nW of received power for a mW of LED power. Thus, it has effective reflectivity of 10−6. This is quite impressive given that it has a surface area of many square centimeters. Now any dust will add to this miniscule reflectivity and become easily noticed. Typical smoke PTRs at the alarm threshold are also in the range of 0.1-1 nW/mW.

Clearly, this geometrical arrangement provides the benefit of measuring dust accumulation while barely changing smoke sensitivity until some critical level of dust is formed. At that point, software can sound an alarm specifically suggesting need for cleaning or replacing the detector system. This critical level of dust may be determined empirically and simply stored as part of the alarm system.

Furthermore, changes in the dust levels will occur slowly, perhaps over weeks to years while smoke alarms must sound within minutes to hours depending on the type of smoke, its concentration etc. Thus, a mathematical operation on the continuous data stream can distinguish between slowly varying "DC" signal and a faster "AC" signal corresponding to the smoke. This is illustrated in the most general fashion in FIG. 3.

Figure 3:
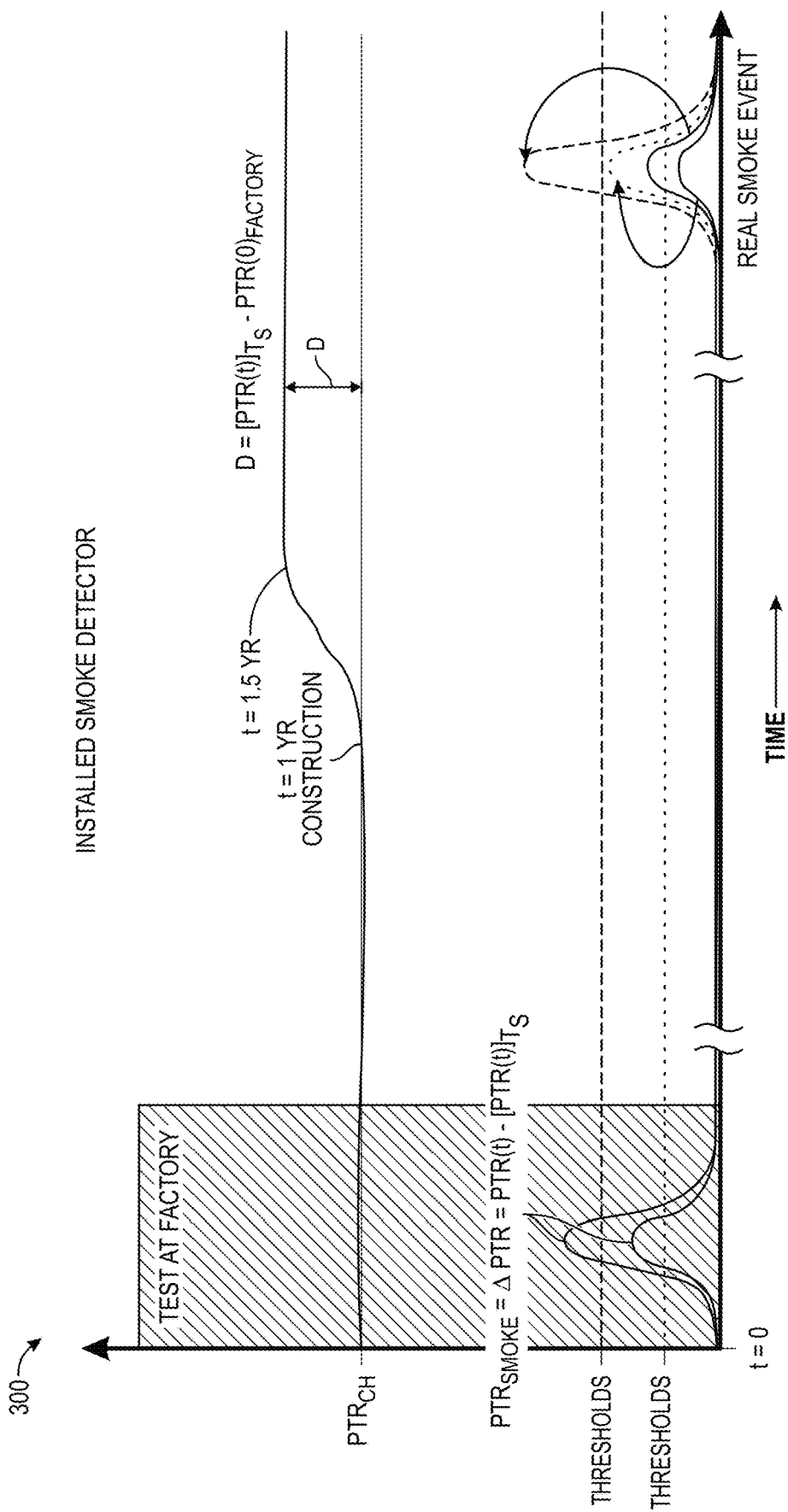
FIG. 3 demonstrates how to account for dust and other slowly varying changes, in accordance with some embodiments of the disclosure provided herein.

FIG. 3 demonstrates how to account for dust and other slowly varying changes, in accordance with some embodiments of the disclosure provided herein. As was demonstrated previously in the disclosure, the accumulation of dust represented as D in FIG. 3 may be used to correct the LED and PD's transfer functions, change the software alarm thresholds, or simply used to detect the critical dust level beyond which the performance of the system is not guaranteed.

In general, measurement of dust D as described in FIG. 3 will be different at the two or more wavelengths and it will be wavelength dependent. Thus, it can be used to assess the type of dust or scattering material on the chamber walls. This in turn can inform us about the quality of all optical surfaces assuming similar rates of deposition and inform the software about setting critical levels of D. This critical dust level and the changes in the PTR of the smoke and the chamber over time are shown in FIG. 4.

FIG. 4 graphically illustrates dust measurement in a smoke chamber as a function of time, in accordance with some embodiments of the disclosure provided herein. Thus, in the presence of smoke, at least two LED wavelengths allows us to measure chamber scattering including dust as well as smoke and both the "DC" and the "AC" values of the PTR at two or more wavelengths. For two wavelength systems, a simple ratio may be formed but for more wavelengths, one may use Mie scattering as a guide in making combination functions of ratios of different LED wavelengths that allow for easy smoke classification.

A further advantage can be gained by having more than one detector. For example, APDP188BI has the capacity to measure scattered signal separately on the two detectors of unequal areas with area ratio of 2. Since these PDs are at different distances from the LED, each PD receives a different average angle of scattering and light intensity from the smoke particles. But the average angle of scattering from the chamber walls as well as intensity received from the walls are roughly the same which makes the signals almost exactly proportional to the PD area.

This means that the chamber signal (whether "DC" or "AC") is directly proportional to the geometrical area while the signal from the smoke has a complex dependence that depends on the relative positions of PDs with respect to the LED and the three-dimensional optical intensity profile above the LED and PDs as well as on the type of smoke particle. Since scattering theory allows one the possibility to do smoke classification, using either wavelength or angles is possible. The two effective angles of scattering correspond to the two detectors. FIG. 4 shows a module that is specifically designed with two PDs with substantially different scattering angles.

In general, for the two detectors $d_1$ & $d_2$ measuring scattering from smoke at two different angles (and perhaps at multiple wavelengths), we can write:

$$PTR_{d1\lambda1}(t) = PTR_{d1\lambda1}^{chamber}(t) + PTR_{d1\lambda1}^{smoke}(t)$$

$$PTR_{d2\lambda1}(t) = PTR_{d2\lambda1}^{chamber}(t) + PTR_{d2\lambda1}^{smoke}(t) \quad \text{Eq. 1}$$

But we know that:

$$\frac{PTR_{d1\lambda1}^{chamber}(t)}{PTR_{d2\lambda1}^{chamber}(t)} = \frac{A_{d1}}{A_{d2}} \quad \text{Eq. 2}$$

$$\frac{PTR_{d1\lambda1}^{smoke}(t)}{PTR_{d2\lambda1}^{smoke}(t)} = \kappa_{\lambda1}(S)\frac{A_{d1}}{A_{d2}}$$

Where $A_{d1}$ or $A_{d2}$ are the areas of the PD $d_1$ or $d_2$, and $\kappa(S)$ is angle and smoke type "S" dependent factor for each of the wavelengths. This immediately suggests that for $\kappa(S)$ is substantially different than unity, and one can solve for the smoke and the chamber PTR ratios.

$$PTR_{d2\lambda1}^{smoke}(t) = \frac{(A_{d2}PTR_{d1\lambda1}(t) - A_{d1}PTR_{d2\lambda1}(t))}{A_{d1}(\kappa_{\lambda1}(S) - 1)} \quad \text{Eq. 3}$$

This allows measurement of the smoke PTR independent of the chamber even when both are changing at the same time. Thus, this suggests setting LED/PD geometries and reflecting surfaces such that one generates κ(S) far from unity for most smoke particles.

In FIG. 3, time-based filtering is shown—which assumes that the chamber changes are slow compared to smoke. Slow chamber dust changes are separated from faster smoke particle changes in the optical signal produced by smoke. In that case, there is a PD for each wavelength:

$$PTR^{smoke}(t) = PTR(t) - \langle PTR(t) \rangle_{T_S} \quad \text{Eq. 4}$$

We also defined dust D (see FIG. 3) as, $$D = \langle PTR(t) \langle_{T_S} - \rangle PTR(0) \rangle_{T_S} \quad \text{Eq. 5}$$

This parameter D will be different for each wavelength and depending on the chamber design, slightly different for each detector.

Eq. 3 and Eq. 4 can be combined to determine κ(S).

$$PTR^{smoke}_{d2\lambda1}(t) = \frac{(A_{d2} PTR_{d1\lambda1}(t) - A_{d1} PTR_{d2\lambda1}(t))}{A_{d1}(\kappa_{\lambda1}(S) - 1)} = \quad \text{Eq. 6}$$

$$PTR_{d2\lambda1}(t) - \langle PTR_{d2\lambda1}(t) \rangle_{T_S} \Rightarrow (\kappa_{\lambda1}(S) - 1) =$$

$$\frac{(A_{d2} PTR_{d1\lambda1}(t) - A_{d1} PTR_{d2\lambda1}(t))}{A_{d1}(PTR_{d2\lambda1}(t) - \langle PTR_{d2\lambda1}(t) \rangle_{T_S})}$$

This can be done for the second wavelength and thus characteristic smoke can be determined.

For the case of two detectors and two wavelengths, we can write different ratios. These are:

$$R_{\lambda d1} = \frac{(PTR_{d1\lambda1}(t) - \langle PTR_{d1\lambda1}(t) \rangle_{T_S})}{PTR_{d1\lambda2}(t) - \langle PTR_{d1\lambda2}(t) \rangle_{T_S}} \quad \text{Eq. 7}$$

$$R_{\lambda d2} = \frac{(PTR_{d2\lambda1}(t) - \langle PTR_{d2\lambda1}(t) \rangle_{T_S})}{PTR_{d2\lambda2}(t) - \langle PTR_{d2\lambda2}(t) \rangle_{T_S}}$$

$$R_{\lambda d} = \frac{(PTR_{d\lambda1}(t) - \langle PTR_{d\lambda1}(t) \rangle_{T_S})}{PTR_{d\lambda2}(t) - \langle PTR_{d\lambda2}(t) \rangle_{T_S}}$$

The ration $R_{\lambda d}$ is the wavelength ratio when output of both detectors is combined. From the measured dust parameters D, $\kappa_\lambda(S)$ at two or more wavelengths and the ratios R, both the state of the chamber—amount of dust, changes in reflectance from grime etc.—and type of smoke and amplitude of scattering from smoke can be found.

Steam remains one of the biggest nuisance sources for smoke alarms. The identification of steam by measuring ratios R or κ(steam) may be possible and may allow the above system to reduce false alarm rates. Reducing the false alarm rate caused by steam is accomplished by complementing optical scattering with a completely different sensor modality. It is noted that sudden appearances of steam in the air will cause some condensation on various surfaces inside the smoke detector. This is measured with a strip line formed on the surface of the PCB with two conductors.

This is shown in FIG. 5. A dipole field between the strip lines allows one to measure the presence of water between the strip lines by changes in the capacitance. Water has a high dielectric constant of around 70 (at low frequencies used in this case) and thus formation of liquid water on a PCB surface will immediately modify the electric field and consequently capacitance. Note that condensation and steam can easily create very confusing optical measurements. Condensing water may form a thin film (and mix with dust already present) or form droplets on the chamber walls or on other optics. This creates strong scattering from the chamber walls which will be changing on the time scale as scattering from the steam droplets. This may make the idea of rejecting this strong scattering signal as not from smoke with high degree of confidence very difficult. But by having the auxiliary strip line measurement of condensing water, one can correlate the changes in the optical signal with steam. Software can then determine to not sound an alarm and reduce false alarm rate from steam.

Currently available smoke detector systems on the market do not provide this functionality. In this case, the AFE provided with the smoke detector system will measure this capacitance change of the strip line. Note that small smoke particles without the steam simply do not have enough fractional volume to cause substantial changes in the capacitance.

The AFE may also provide an easy means to measure electric current that flows from electrochemical cells (EC). One of the most popular EC is the one used to measure CO. It is well known that incomplete combustion in fire causes elevated levels of CO. If the smoke detector happens to have a line of sight to the hot surface caused by fire or to fire itself, then a photodetector can measure the blackbody radiation coming from hot (300-1000 C) surfaces. This radiation will predominantly increase in the 3-7 μm region of EM radiation (often called the mid-wave infrared region or MWIR). Such an IR measuring photodetector can provide additional direct measurement of the existence of fire in the surroundings.

AFE may also measure conventional temperature sensors which can provide data on changes in the air temperature.

All the above sensors are read out to provide a comprehensive view of the environment in order to provide an accurate alarm for fire while reducing probability of false alarm.

In order to carry out the sensor reading from such a wide variety of sensors, the AFE can be programmed to repeat the following sequence: (1) blink LED 1 and measure response to two detectors, (2) blink LED 2 and measure response of two detectors, (3) measure strip line, (4) measure one or more temperature sensors, (5) measure CO sensor, (6) measure one or more IR sensors pointed in different directions, etc. The same AFE can be configured to make all these measurements. One such AFE and its architecture is discussed in U.S. Pat. No. 9,733,275, which is hereby incorporated by reference. Some of the sensors may be measured more often than the others depending on the algorithmic need to provide most accurate alarm and conserve battery.

A microprocessor attached to the AFE can analyze the data according to the method presented here and form a good judgement on the amount and type of smoke, accumulation of dust, and presence of steam. It can also correlate these parameters with other environmental parameters such as sudden increase in MWIR radiation or sudden changes in air temperature. A smoldering fire can generate copious amounts of CO, while producing little smoke and CO measuring sensor can provide warning about the fire. While CO detectors are relatively common as part of the smoke alarm system, they are usually read by separate AFE which leads to increased cost and footprint of the smoke detector assembly.

FIG. 5 demonstrates the detection and measurement of water within the exemplary fire detection system, in accordance with some embodiments of the disclosure provided herein.

Turning to FIG. 5A, condensation sensor 500 comprises PCB 560, dielectric coating 570 and electrodes 530, 540. Electrodes 530, 540 can be single capacitive elements suitable for detecting the presence of moisture. However, in the present embodiment, electrodes 530, 540 are dipole capacitive elements. In operation, varying electrical fields 520 can be measured and determined.

Turning to FIG. 5B, condensation sensor 510 comprises PCB 560, dielectric coating 570 and electrodes 530, 540. Electrodes 530, 540 measure changes in the electric field 520 in the presence of water and/or steam. As can be appreciated by one skilled in the art, the capacitive change is significant and readily detectable.

Figure 6:
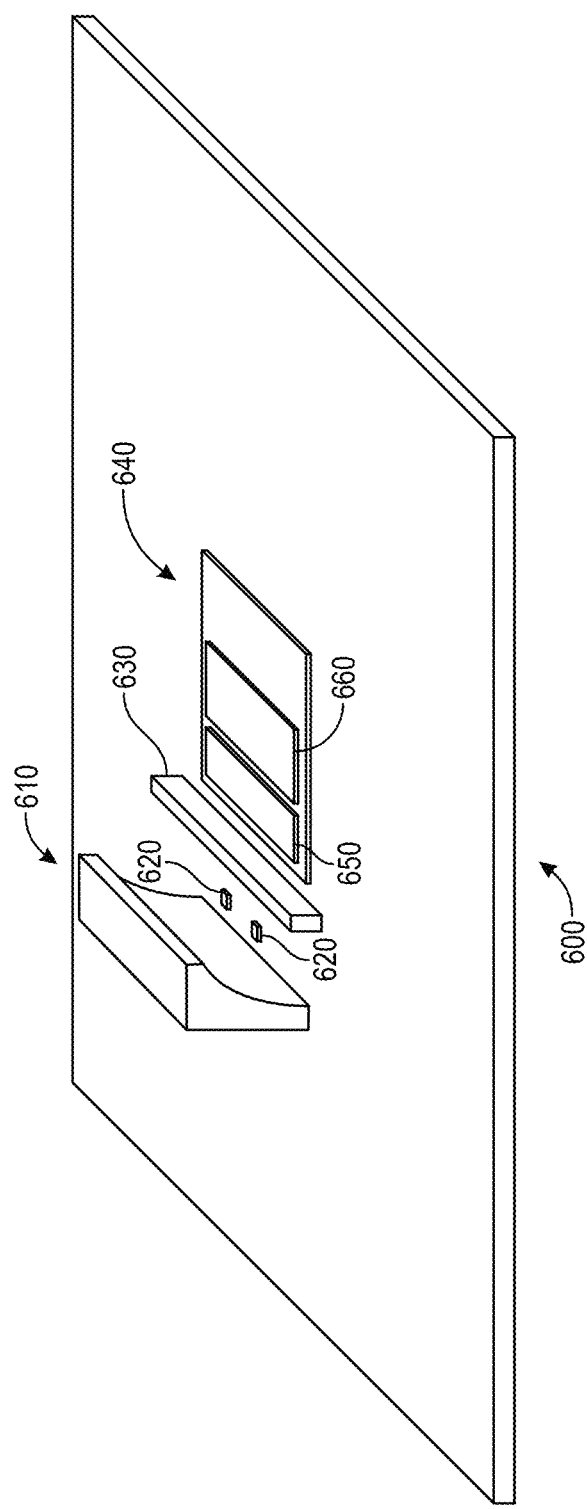

FIG. 6 depicts the orthogonal view of an optical deflector comprised by an exemplary fire detector 600, in accordance with some embodiments of the disclosure provided herein. Smoke detector 600 comprises optical module 610, LEDs 620, septum 630, PDs 650, 660, AFE 640, disposed on a PCB, laminate or other suitable substrate.

In reference to the scattering theory of light, the inventors' observations and models closely conform, is consistent with and reflect this well-known theory, known to those in the art. As such, the observations that follow stem from an underlying physics and thus more general than any particular device enumerated in several of the embodiments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In some embodiments, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc.

Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An apparatus for detecting smoke within a compact footprint detector which compensates the deleterious effects of dust, thereby increasing longevity and efficacy, the apparatus comprising:
   a first light source;
   a first photodetector disposed proximate to the first light source; and
   a digital circuit for performing:
      receiving a first signal from the first photodetector, the first signal is based on light which has been scattered from the first light source;
      performing a baseline factory measurement of light with no particulate matter present;
      performing an in-situ measurement;
      periodically performing an automatic self-calibration test comparing the baseline factory measurement with the in-situ measurement of light;
      calibrating the apparatus for detector smoke using the automatic self-calibration test result; and,
      determining a presence of smoke and a type of smoke at least based on the first received signal and calibration, wherein the type of smoke is determined based on an average angle of the light being scattered in the first received signal;
      wherein the first photodetector is configured to receive no direct light from the first light source.

2. The apparatus according to claim 1 further comprising a septum disposed between the first photodetector and the first light source.

3. The apparatus according to claim 1 further comprising an optical reflective element configured to reflect light from the first light source towards the first photodetector.

4. The apparatus according to claim 3 wherein the optical reflective element has a profile shaped like a conic section.

5. The apparatus according to claim 4 wherein the conic section is a parabola.

6. The apparatus according to claim 4 wherein the conic section is an ellipse.

7. The apparatus according to claim 1 wherein the first light source is an LED.

8. The apparatus according to claim 1 wherein the digital circuit further performs time-based filtering.

9. The apparatus according to claim 1 further comprising a second light source and second photodetector.

10. The apparatus according to claim 9 wherein the determination of the presence of smoke includes calculating a ratio from signal received from the first and second photodetectors.

11. The apparatus according to claim 1 further comprising a cap.

12. The apparatus according to claim 11 wherein the cap has a refractive index between 1.4-1.7.

13. The apparatus according to claim 12 wherein the cap is lossy.

14. A method for detecting smoke within a compact footprint detector which compensates the deleterious effects of dust, thereby increasing longevity and efficacy, the method comprising:
   emitting light from a first light source;
   receiving the light which has been scattered from a first photodetector disposed proximate to the first light source; and
   receiving a first signal from the first photodetector;
   performing a baseline factory measurement of light with no particulate matter present;
   performing an in-situ measurement;
   periodically performing an automatic self-calibration test comparing the baseline factory measurement with the in-situ measurement of light;
   calibrating the apparatus for detecting smoke using the automatic self-calibration test result; and,
   determining a presence of smoke and a type of smoke at least based on the first received signal and calibration, wherein the type of smoke is determined based on an average angle of the light being scattered in the first received signal;
   wherein the first photodetector is configured to receive no direct light from the first light source.

15. The method according to claim 14 further comprising blocking light which can directly propagate between the first photodetector and the first light source.

16. The method according to claim 15 further comprising using a septum disposed between the first photodetector and the first light source to block the light.

17. The method according to claim 14 further comprising reflecting light from the first light source towards the first photodetector.

18. The method according to claim 14 further comprising emitting light from a second light source.

19. The method according to claim 14 further comprising receiving light from at a second photodetector.

20. The method according to claim 19 further comprising calculating a ratio from signal received from the first and second photodetectors.

21. The method according to claim 20 further comprising determining the presence of smoke based at least on the calculated ratio.

22. The method according to claim 14 further comprising performing time-based filtering.

23. An apparatus for detecting smoke within a compact footprint detector which compensates the deleterious effects of dust, thereby increasing longevity and efficacy, the apparatus comprising:
   a first light source;
   a first photodetector disposed proximate to the first light source; and
   a digital circuit for;
      receiving a first signal from the first photodetector;
      performing a baseline factory measurement of light with no particulate matter present;
      performing an in-situ measurement;

periodically performing an automatic self-calibration test comparing the baseline factory measurement with the in-situ measurement of light;
calibrating the apparatus for detecting smoke using the automatic self-calibration test result; and,
determining a presence of smoke and a type of smoke at least based on the first received signal and calibration, wherein the type of smoke is determined based on an average angle of the light being scattered in the first received signal;
wherein the first photodetector is configured to receive no direct light from the first light source.

* * * * *